(12) United States Patent
Shen et al.

(10) Patent No.: US 11,993,138 B2
(45) Date of Patent: May 28, 2024

(54) BUCKLE LOCKING STRUCTURE DEVICE FOR REAR COMPARTMENT COVER OF PICKUP TRUCKS

(71) Applicants: Gai-Lee Shen, Taipei (TW); Chun-Hung Yeh, Kaohsiung (TW)

(72) Inventors: Gai-Lee Shen, Taipei (TW); Chun-Hung Yeh, Kaohsiung (TW)

( * ) Notice: Subject to any disclaimer, the term of this patent is extended or adjusted under 35 U.S.C. 154(b) by 630 days.

(21) Appl. No.: 17/134,116

(22) Filed: Dec. 24, 2020

(65) Prior Publication Data
US 2022/0203813 A1 Jun. 30, 2022

(51) Int. Cl.
*B60J 7/19* (2006.01)
(52) U.S. Cl.
CPC ..................... *B60J 7/198* (2013.01)
(58) Field of Classification Search
CPC .......... B60J 7/198; B60J 7/1607; B60J 7/102; A44B 11/226
See application file for complete search history.

(56) References Cited

U.S. PATENT DOCUMENTS

| | | | | |
|---|---|---|---|---|
| 7,823,957 B2* | 11/2010 | Williamson | ............. | B60J 7/104 292/DIG. 49 |
| 9,862,257 B1* | 1/2018 | Kozlowski | ............... | B60J 7/198 |
| 10,232,691 B1* | 3/2019 | Weng | ........................ | B60J 7/198 |
| 10,315,498 B2* | 6/2019 | Parkey | ...................... | B60J 7/198 |
| 10,710,437 B2* | 7/2020 | Chen | ........................ | B60J 7/198 |
| 10,919,369 B2* | 2/2021 | Lewis | ....................... | B60J 7/104 |
| 11,014,436 B1* | 5/2021 | Zheng | ...................... | B60J 7/198 |
| 2010/0270824 A1* | 10/2010 | Yue | ............................ | B60J 7/198 296/100.07 |
| 2011/0260493 A1* | 10/2011 | Xu | ............................. | B60J 7/198 296/100.07 |
| 2015/0001877 A1* | 1/2015 | Fink | ......................... | B60J 7/104 296/100.17 |
| 2017/0066311 A1* | 3/2017 | Facchinello | ............. | B60J 7/198 |
| 2017/0197498 A1* | 7/2017 | Facchinello | ............. | B60J 7/106 |
| 2019/0315209 A1* | 10/2019 | Lewis | ....................... | B60J 7/141 |
| 2020/0062095 A1* | 2/2020 | Xu | ............................. | B60J 7/198 |
| 2020/0094660 A1* | 3/2020 | Ma | ............................ | B60J 7/185 |
| 2020/0148046 A1* | 5/2020 | Ma | ............................ | B60J 7/141 |
| 2020/0189368 A1* | 6/2020 | Potter | ..................... | B60R 9/045 |

* cited by examiner

*Primary Examiner* — David M Upchurch

(57) ABSTRACT

A buckle locking structure device for a rear compartment cover of a pickup truck includes: a cross rod aluminum extrusion (1); a slider (2); a T-rod (3); a buckle block (4); a handle (5); a T-insertion block (7); and a frame body aluminum extrusion (8); a lug (403) provided center of a bottom surface of the buckle block (4); left and right semi-circular arc flanges (4031) provided on the center of the bottom surface of the buckle block (4) on a and to left and right sides of the lug (403), respectively; a left edge part slot (5031) extending towards lug (403) and being engageable with the left semi-circular arc flange (4031) of the buckle block (4) so that the left edge part slot (5031) slides on the left semi-circular arc flange (4031) of the buckle block (4) for fastening.

1 Claim, 7 Drawing Sheets

BUCKLE LOCKING STRUCTURE DEVICE FOR REAR COMPARTMENT COVER OF PICKUP TRUCKS

TECHNICAL FIELD

The present invention relates generally to a buckle locking structure device for the rear compartment cover of pickup trucks, and more particularly to an assembled buckle locking structure device of the present invention, which can be quickly and accurately moved to the position to be buckled, as long as the handle is pressed down gently, the semi-circular arc flanges on both sides of the lug at the bottom of buckle block can be quickly and positively seized by the shoulder edge parts on both sides of U-slideway of handle easily along the semi-circular arc flanges on both sides of the lug at the bottom of buckle block using the slot in the shoulder edge part of handle, so as to implement rapid motion and fastening. It is really a particular and innovative invention with economic benefit.

TECHNICAL BACKGROUND

With advance of science and technology and development of industry, the pickup trucks have possessed a share of market gradually for large goods loadability or loading capacity and large horsepower. However, the rear compartment of pickup trucks is designed as an open space, the circle has designed a cover to achieve a close function, how to provide convenient operation and quick fastening is an urgent issue for the circle.

In view of this, the inventor of the present invention probed into the aforesaid demand according to years' experience in research and development in related domains, and sought for a solution according to the aforesaid demand. The present invention was finally completed through a long study and multiple tests, so as to remedy the existing defects and enhance the progressiveness and practicability.

SUMMARY OF INVENTION

Therefore, the fundamental purpose of the present invention is to provide a "buckle locking structure device for rear compartment cover of pickup trucks", using the characteristic of the slider of the assembled buckle locking structure device of the present invention which can move on the cross rod aluminum extrusion quickly, so that the buckle locking structure device can be moved to the position to be fastened quickly and accurately, and then the handle of the buckle locking structure device is turned, the buckle block can move up to the buckling height, as long as the handle is pressed gently, the shoulder edge parts on both sides of the U-slideway on the handle can seize the semi-circular arc flanges on both sides of the lug at the bottom of buckle block, so as to implement quick fastening.

The present invention provides a buckle locking structure device for a rear compartment cover of a pickup truck, comprising: a cross rod aluminum extrusion, a slider, a T-rod, a buckle block, a handle, a T-insertion block, and a frame body aluminum extrusion, wherein the buckle block is a rectangular block, a buckle slot is provided on a left side of the buckle block, and a hook part is provided on a left side of the buckle slot, a platform is provided on the buckle slot, a cylinder is provided in a center of the platform, and a first through hole is provided in a center of the cylinder, wherein a shaft of a T-rod passes through the through hole allows, wherein the handle is in a strip shape, wherein a top end of the handle has a U-slideway, wherein the U-slideway extends downwards to an appropriate position and is adjacent to the hand grip, wherein right and a left shoulder edge parts are provided on right and left sides of the U-slideway, respectively, wherein left and right through holes are provided in left and right end faces of the U-slideway, respectively, wherein the cross rod aluminum extrusion is in a hollow strip shape, wherein a channel is provided in a center of the cross rod aluminum extrusion, wherein the slider is a rectangular hollow block, wherein a slide hole channel is provided in an upper part of a center of the slider, wherein the slide hole channel is fittable over the cross rod aluminum extrusion so that the slider can move back and forth quickly on the cross rod aluminum extrusion, wherein a vertical U-shaped channel and a transverse U-shaped channel are provided in a lower part of the center of the slider, wherein the vertical U-shaped channel and the transverse U-shaped channel are crossed each other, wherein a lug is provided in a center of a bottom of the platform, wherein left and right semi-circular arc flanges are provided on left and right sides of the lug, respectively, wherein a left groove face is provided which is recessed inwards on a lower inner side wall of the left shoulder edge part, so that a left shoulder edge part slot on a bottom end face of the left shoulder edge part is formed between the left groove face and the left shoulder edge part, wherein a right groove face is provided which is recessed inwards on the lower inner side wall of the right shoulder edge part so that a right shoulder edge part slot on a bottom end face of the right shoulder edge part is formed between the right groove face and the right shoulder edge part, wherein the left edge part slot is engageable with the left semi-circular arc flange of the buckle block so that the left edge part slot can slide along the left semi-circular arc flange of the buckle block for fastening, wherein the right edge part slot is engageable with the right semi-circular arc flange of the buckle block so that the right edge part slot can slide along the right semi-circular arc flange of the buckle block for fastening.

EMBODIMENTS

To further clarify the purpose, effect and structural feature of the present invention, the following preferred embodiments are given and described with figures.

Figure 1:
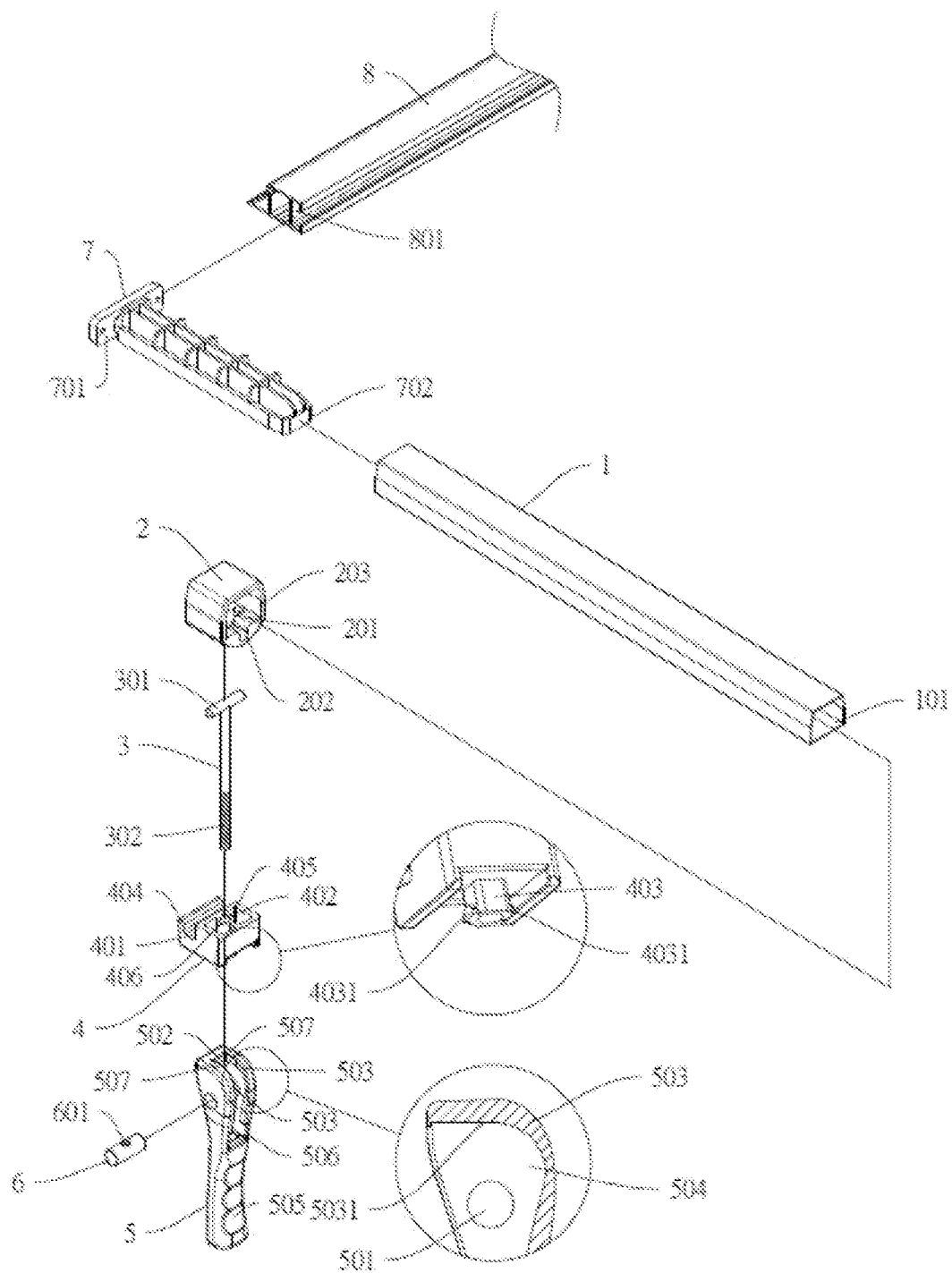
FIG. 1: Three-dimensional exploded view of the present invention.
Figure 2:
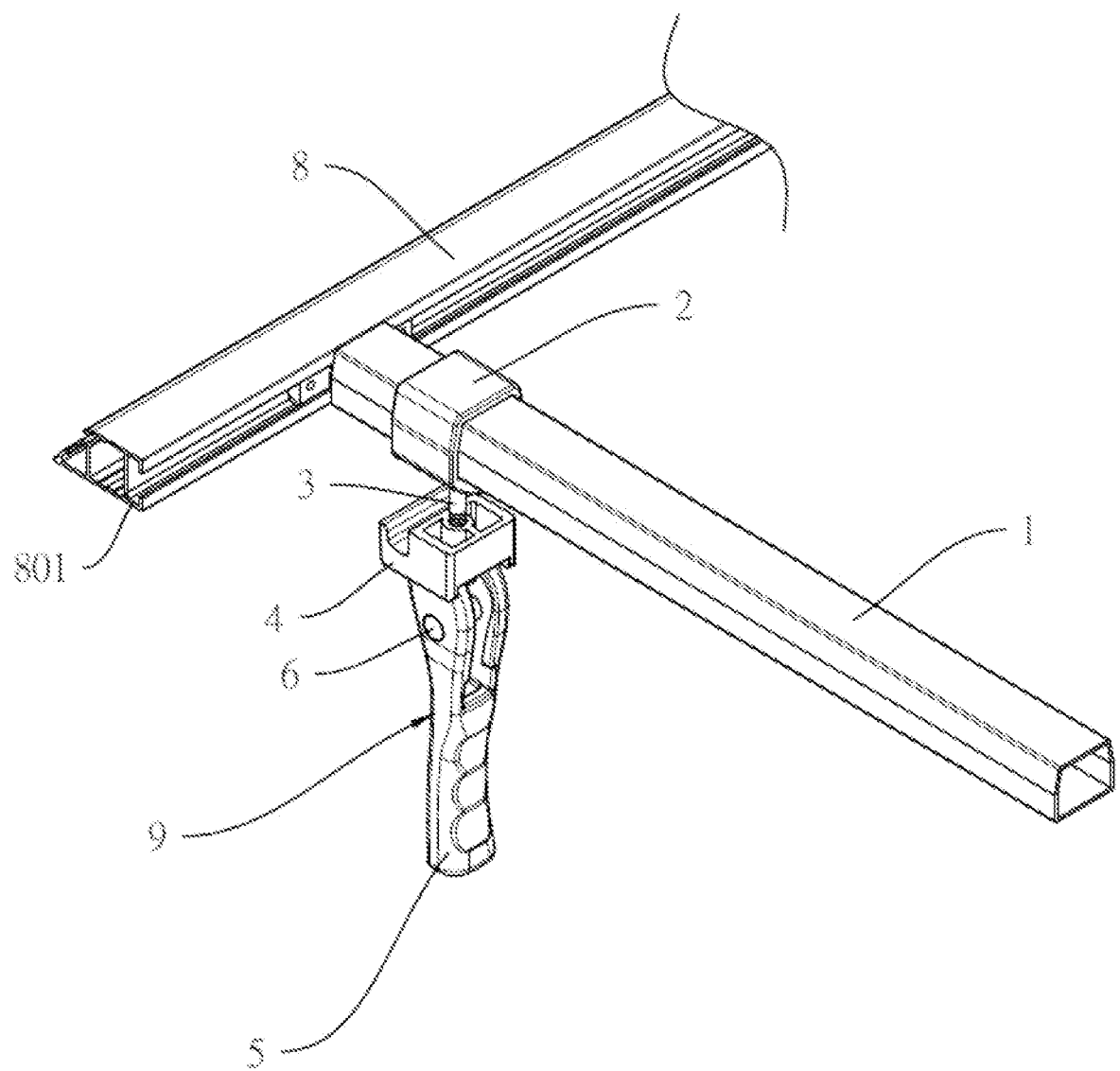
FIG. 2: Three-dimensional combined diagram of the present invention.

As shown in FIG. 1 and FIG. 2, the present invention relates generally to a buckle locking structure device for the rear compartment cover of pickup trucks, comprising a cross rod aluminum extrusion 1, a slider 2, a T-rod 3, a buckle block 4, a handle 5, a T-insertion block 7 and a frame body aluminum extrusion 8, wherein The cross rod aluminum extrusion 1 is a hollow strip, there is a channel 101 in its center.

The slider 2 is a rectangular hollow block, there is a slide hole channel 203 in the upper half of its center, the slide hole channel 203 can be fitted over the cross rod aluminum extrusion 1, so that the slider 2 can move back and forth quickly on the cross rod aluminum extrusion 1. There is a vertical U-shaped channel 201 and a transverse U-shaped channel 202 in the lower part of its center. The vertical U-shaped channel 201 and transverse U-shaped channel 202 are crossed.

The T-rod 3 is T-shaped, its top is a T-head 301, there is a threaded rod 302 in appropriate position of lower end. The T-head 301 passes through the vertical U-shaped channel 201 of slider 2, after it is turned 90°, it can be fixed to the transverse U-shaped channel 202.

The buckle block 4 is a rectangular block, there is a buckle slot 401 on its left. There is a hook part 404 on the left of buckle slot 401. There is a platform 405 on the right of buckle slot 401. There is a cylinder 406 in the center of the platform 405. There is a through hole 402 in the center of the cylinder 406. The through hole 402 allows the shaft of T-rod 3 to pass through. There is a lug 403 in the center of bottom of the platform 405, there is a semi-circular arc flange 4031 on two sides of the lug 403 respectively.

The handle 5 is columnar, its top end has a U-slideway 502, extending downwards to an appropriate position, adjacent to the hand grip 505. A shoulder edge part 503 is formed on right and left sides of the U-slideway 502 respectively. The lower inner side wall of each shoulder edge part 503 is a groove face 504 recessed inwards, forming a shoulder edge part slot 5031 on the bottom end face of shoulder edge part 503 between the groove face 504 and shoulder edge part 503. The edge part slot 5031 can be buckled with the semi-circular arc flange 4031 of buckle block 4, so that the edge part slot 5031 can slide along the semi-circular arc flange 4031 of buckle block 4 for fastening. There is a through hole 501 on left and right end faces of U-slideway 502 respectively.

The T-insertion block 7 is T-shaped, its one end has a T-head 701, the other end has a shaft 702. The shaft 702 can be inserted in the channel 101 of cross rod aluminum extrusion 1 to form one piece.

The frame body aluminum extrusion 8 is a strip, there is a slideway 801 on its one side edge, the T-head 701 of T-insertion block 7 can be inserted in the slideway 801, so that T-insertion block 7 can move to any position of slideway 801 of frame body aluminum extrusion 8 quickly using the T-head 701.

Figure 3:
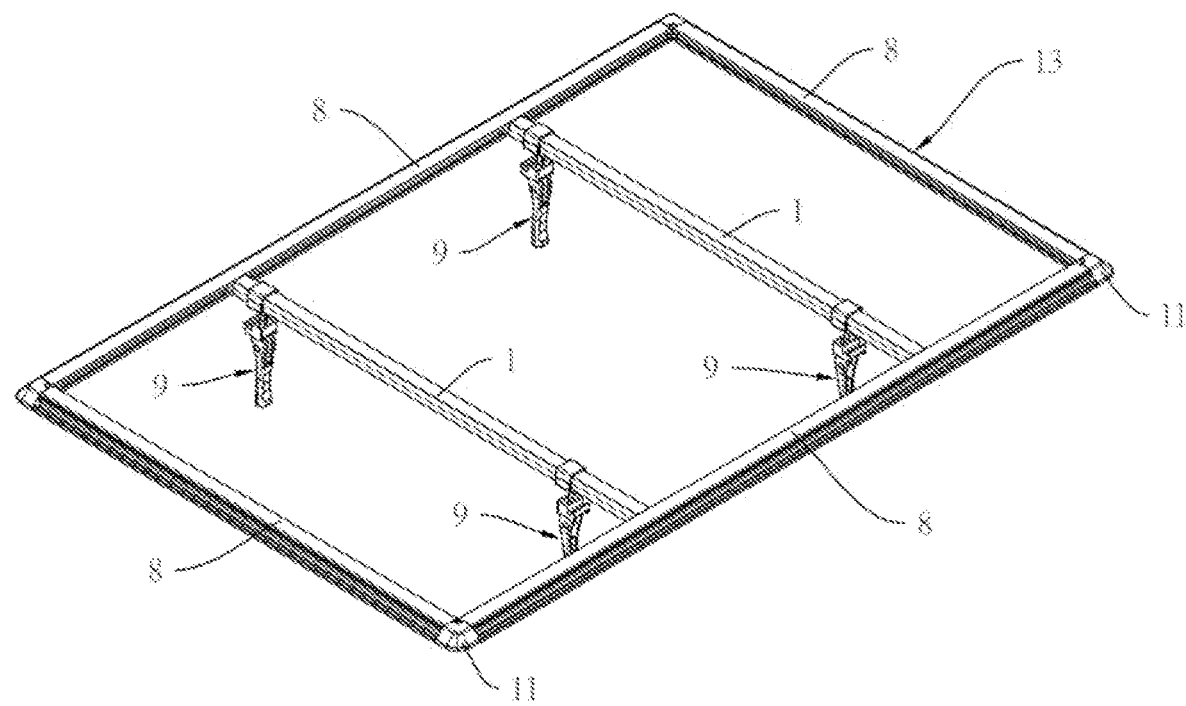
FIG. 3: State diagram of in-service use of the present invention.

Please refer to FIG. 1, FIG. 2 and FIG. 3 for assembly. The T-head 301 of T-rod 3 is put in the vertical U-shaped channel 201 of slider 2, and turned 90° to put the T-head 301 in the transverse U-shaped channel 202. Afterwards, the T-rod 3 passes through the through hole 402 in the platform 405 of buckle block 4 and out of the bottom. The perforation part 506 of handle 5 is aligned with the semi-circular arc flanges 4031 on both sides of the lug 403 of buckle block 4, so that the semi-circular arc flange 4031 is put in the groove face 504, the handle 5 is turned to normal state, the hand grip 505 faces down, so that the semi-circular arc flange 4031 can slide in the shoulder edge part slot 5031 of shoulder edge part 503 of handle 5. Afterwards, the circular insertion block 6 is inserted in the through hole 501 of handle 5, and the circular insertion block 6 is rotated to make its threaded hole 601 open upwards for fixing the threaded rod 302 of T-rod 3. The slide hole channel 203 of slider 2 is inserted in the cross rod aluminum extrusion 1, the assembly of buckle locking structure device 9 of the present invention is completed.

Afterwards, a plurality of T-insertion blocks 7 and frame body aluminum extrusion 8 are used, the shaft 702 of T-insertion block 7 is inserted in the channel 101 of cross rod aluminum extrusion 1, and the T-head 701 of T-insertion block 7 is inserted in the slideway 801 of frame body aluminum extrusion 8, and a plurality of corner blocks II are used, the assembly of framework 13 shown in FIG. 3 is completed.

Figure 4A:
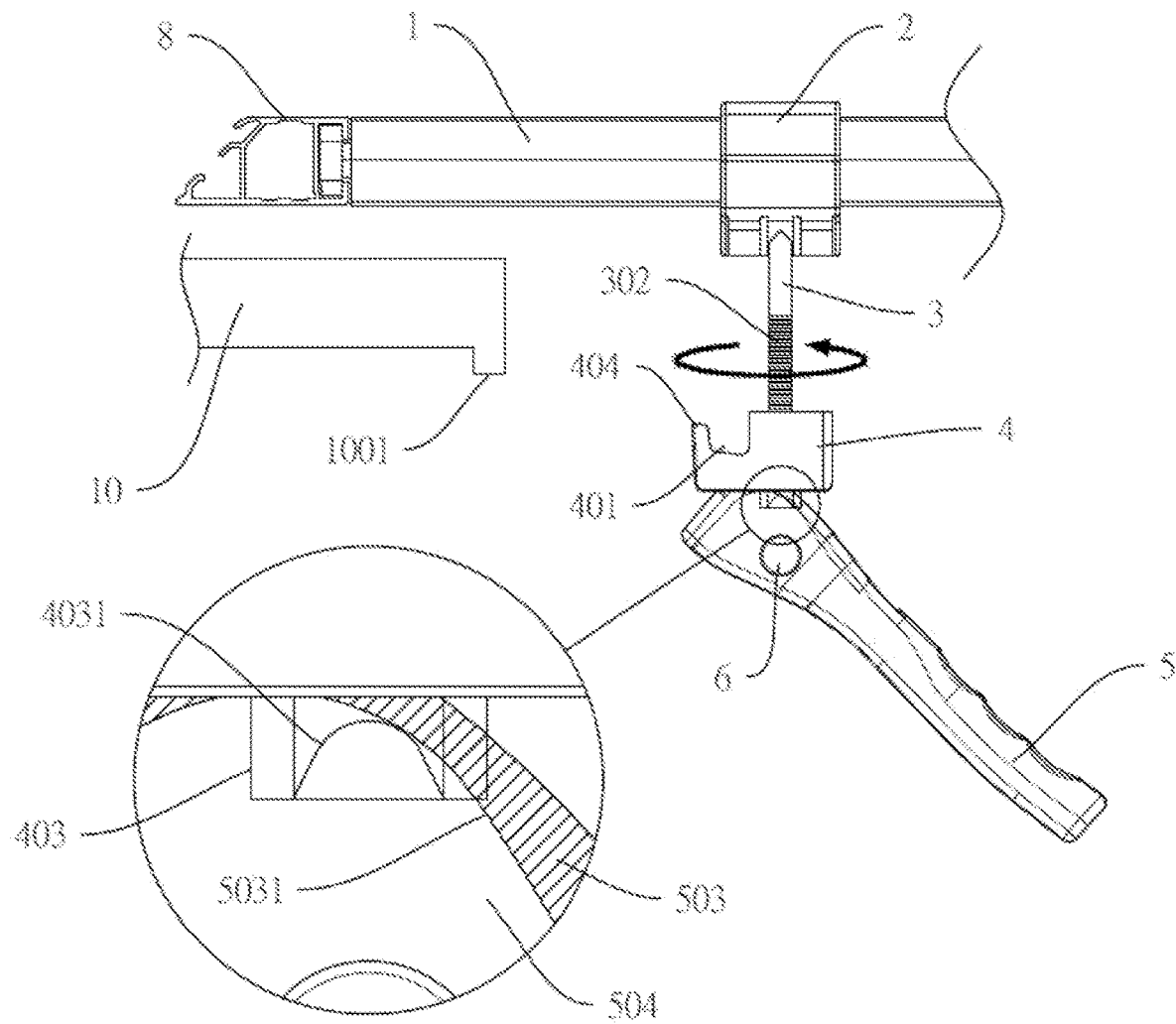
FIG. 4A: Schematic diagram (1) of actuation of the present invention.
Figure 4B:
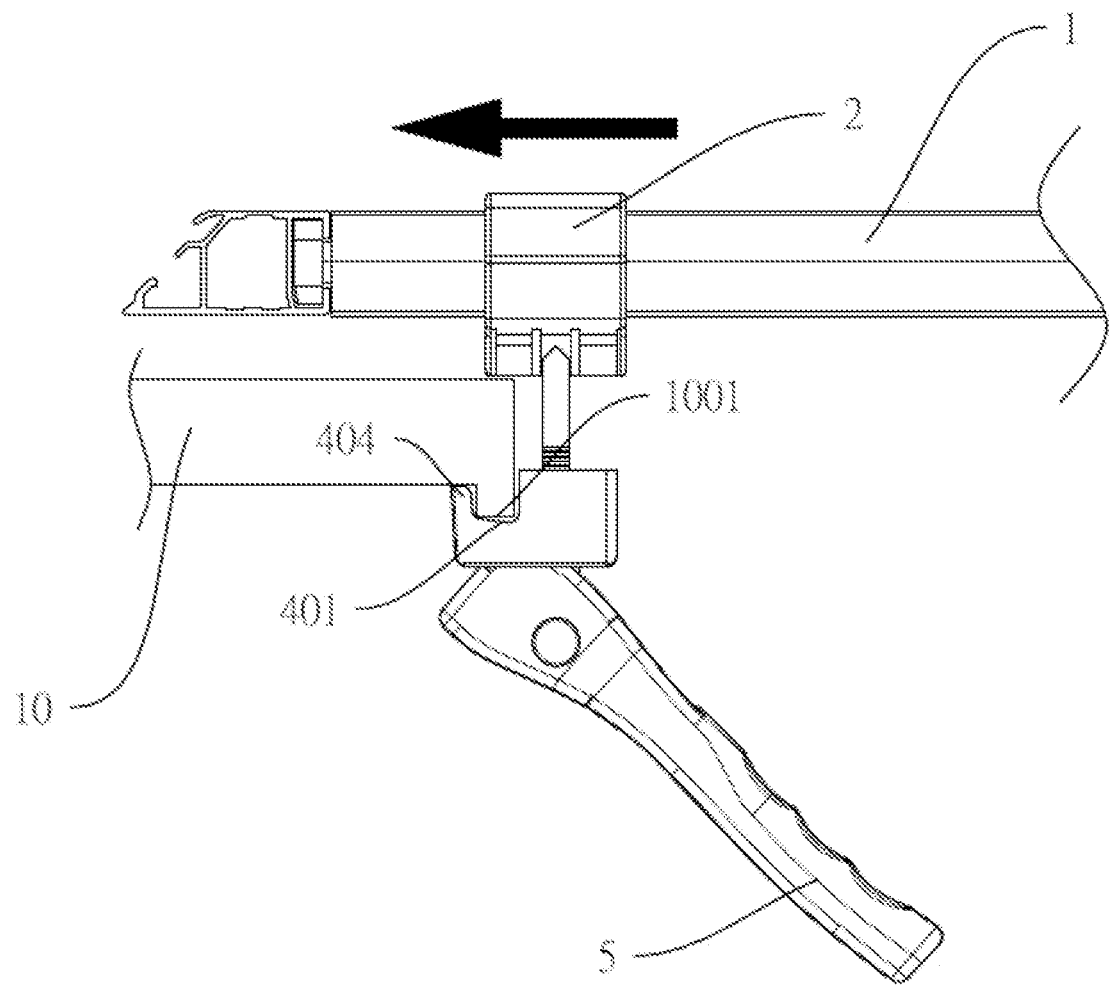
FIG. 4B: Schematic diagram (2) of actuation of the present invention.
Figure 4C:
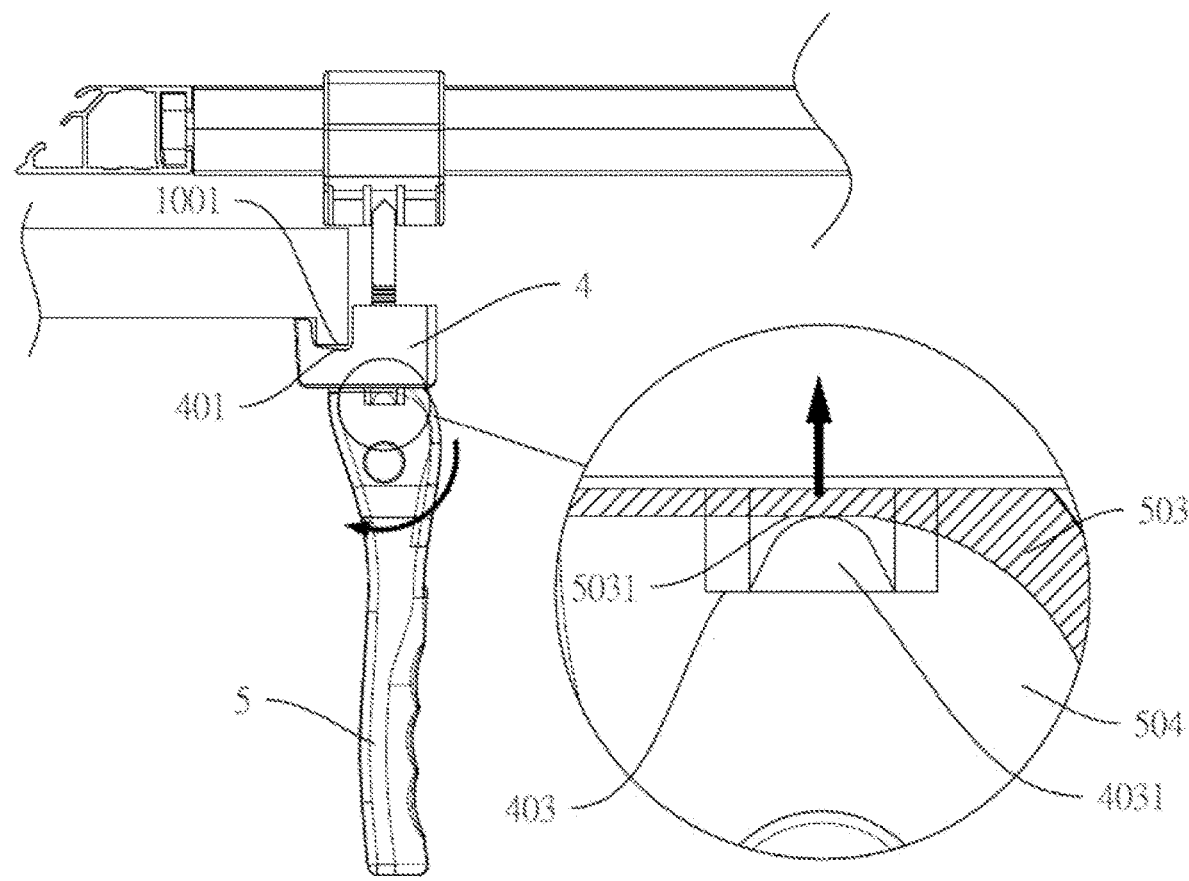
FIG. 4C: Schematic diagram (3) of actuation of the present invention.
Figure 4D:
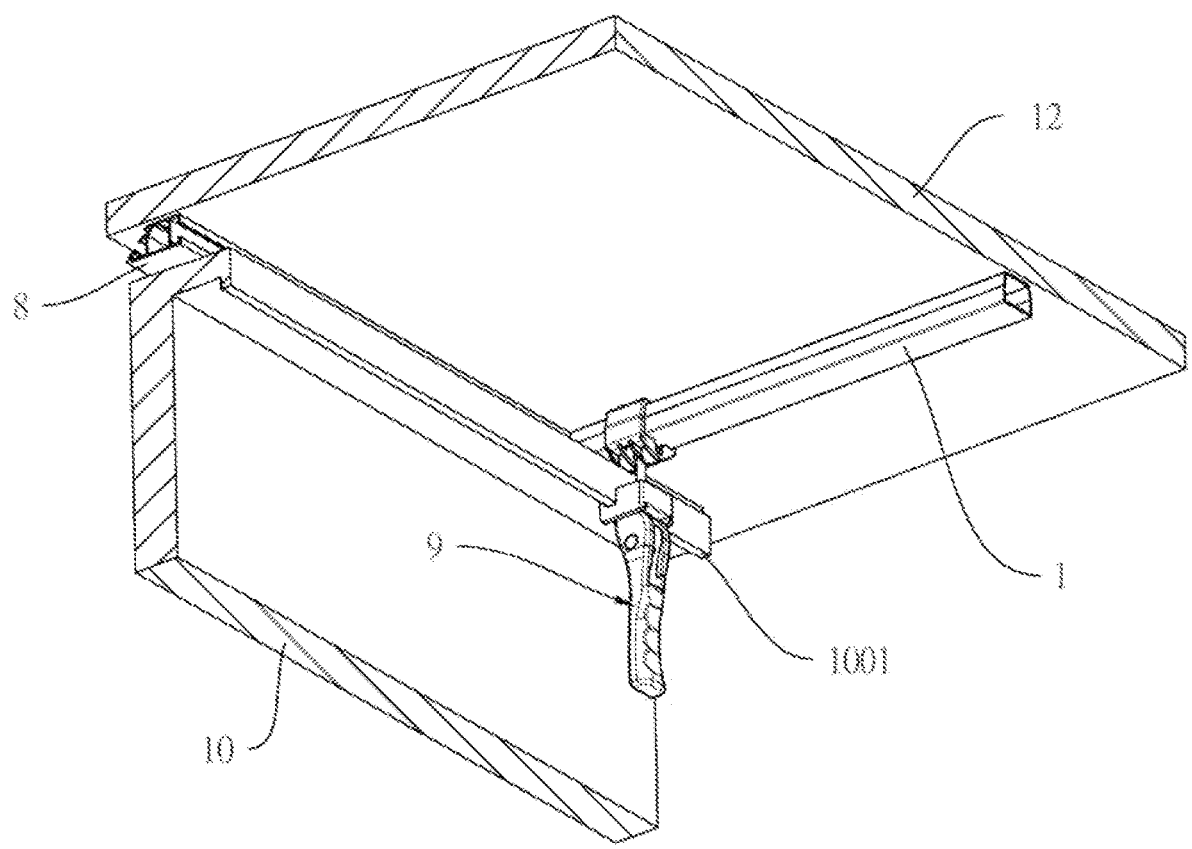
FIG. 4D: Schematic diagram (4) of actuation of the present invention.

The operation is shown in FIG. 4A, FIG. 4B, FIG. 4C and FIG. 4D. To fasten the compartment cover 12 screwed to the framework 13 shown in FIG. 4D to the rear compartment of pickup truck, as shown in FIG. 4A, the handle 5 is tilted, the transverse thickness of semi-circular arc flange 4031 contacts the shoulder edge part slot 5031 in the lower part of shoulder edge pan 503, so that the semi-circular arc flange 4031 is hidden in the groove face 504 of handle 5. Afterwards, the handle 5 is turned, the threaded rod 303 of T-rod 3 drives the buckle block 4 to go up. When the buckle block 4 rises to a certain level, the slider 2 is moved along the cross rod aluminum extrusion 1, the slider 2 takes the buckle block 4 to quickly reach the flange 1001 to be fixed to the compartment side wall 10, and then the handle 5 is turned slightly, the hook part 404 of buckle block 4 can be fastened to the flange 1001 of compartment side wall 10 (as shown in FIG. 4B). The handle 5 is pressed down gently, the shoulder edge part slot 5031 in the lower part of shoulder edge part 503 presses down along the semi-circular are flange 4031 of buckle block 4, meanwhile the top end 507 of handle 5 extrudes the buckle block 4 upwards, so that the hook part 404 of buckle block 4 is fastened to the flange 1001 of compartment side wall 10 more firmly, the buckle locking of the rear compartment cover of pickup truck is completed.

To sum up, the buckle locking structure device for the rear compartment cover of pickup trucks of the present invention is designed by the inventor of the present invention with meticulous mental effort, it has a particular, simple and easily buckled structure, and it is characterized by innovation thinking and simplified assembly, meeting the essentials of patent for invention of Patent Act. Therefore, an application is filed according to law, looking forward to the reviewers' approval, thank you.

Although the invention has been explained in relation to its preferred embodiment, it is to be understood that many other possible modifications and variations can be made without departing from the spirit and scope of the invention as hereinafter claimed.

SYMBOL DESCRIPTION

| | |
|---|---|
| 1 Cross rod aluminum extrusion strip | 101 Channel |
| 2 Slider | 201 Vertical U-shaped channel |
| 202 Transverse U-shaped channel | 203 Slide hole slot |
| 3 T-rod | 301 T-head |
| 302 Threaded rod | |
| 4 Buckle block | 401 Buckle slot |
| 402 Through hole | 403 Lug |
| 4031 Semi-circular arc flange | 404 Hook part |
| 405 Platform | 406 Cylinder |
| 5 Handle | 501 Through hole |
| 502 U-slideway | 503 Shoulder edge part |
| 5031 Shoulder edge part slot | |
| 504 Groove face | 505 Hand grip |
| 506 Perforation part | 507 Top end |
| 6 Barrel bolt | 601 Threaded hole |

-continued

| | |
|---|---|
| 7 T-insertion block | 701 T-head |
| 702 Shaft | |
| 8 Frame body aluminum extrusion | 801 Sideway |
| 9 Buckle locking structure device | |
| 10 Compartment side wall | 1001 Flange |
| 11 Corner block | |
| 12 Cover | |

What is claimed is:

1. A buckle locking structure device for a rear compartment cover of a pickup truck, includes:
  a cross rod aluminum extrusion (1), a slider (2), a T-rod (3), a buckle block (4), a handle (5), a T-insertion block (7), and a frame body aluminum extrusion (8),
  wherein the buckle block (4) is a rectangular block,
  wherein a buckle slot (401) is provided on the buckle block (4),
  wherein a cylinder (406) is provided on a center of a top surface of the buckle slot (401),
  wherein a first through hole is provided in a center of the cylinder (406),
  wherein the cross rod aluminum extrusion (1) is in a hollow strip shape, wherein a channel (101) is provided in a center of the cross rod aluminum extrusion (1),
  wherein the slider (2) is a rectangular hollow block, wherein a slide hole channel (203) is provided in an upper part of a center of the slider, wherein the slide hole channel (203) is fittable over the cross rod aluminum extrusion (1) so that the slider can move back and forth quickly on the cross rod aluminum extrusion (1),
  wherein a vertical U-shaped channel (201) and a transverse U-shaped channel (202) are provided in a lower part of the center of the slider, wherein the vertical U-shaped channel and the transverse U-shaped channel are crossed each other,
  wherein a lug (403) is provided on a center of a bottom surface of the buckle block (4),
  wherein left and right semi-circular arc flanges (4031) are provided on the center of the bottom surface of the buckle block (4) and to left and right sides of the lug (403), respectively,
  wherein a left groove face (504) is provided on a lower inner side wall of the buckle block (4),
  wherein a right groove face (504) is provided on the lower inner side wall of the buckle block (4),
  wherein a left edge part slot (5031) extends from the left groove face (504) towards lug (403) and is engageable with the left semi-circular arc flange (4031) of the buckle block (4) so that the left edge part slot (5031) slides on the left semi-circular arc flange (4031) of the buckle block (4) for fastening,
  wherein the right edge part slot (5031) extends from the right groove face (504) towards lug (403) and is engageable with the right semi-circular arc flange (4031) of the buckle block so that the right edge part slot (5031) slides on the right semi-circular arc flange (4031) of the buckle block (4) for fastening.

* * * * *